(12) United States Patent
Schippl

(10) Patent No.: US 7,237,317 B2
(45) Date of Patent: Jul. 3, 2007

(54) PROCESS FOR PRODUCING A SUPERCONDUCTING CABLE

(75) Inventor: Klaus Schippl, Hannover (DE)

(73) Assignee: Nexans, Paris (FR)

( * ) Notice: Subject to any disclaimer, the term of this patent is extended or adjusted under 35 U.S.C. 154(b) by 28 days.

(21) Appl. No.: 10/826,148

(22) Filed: Apr. 15, 2004

(65) Prior Publication Data
US 2004/0255452 A1    Dec. 23, 2004

(30) Foreign Application Priority Data
May 20, 2003    (DE) ................................ 103 22 625

(51) Int. Cl.
*H01L 39/24*    (2006.01)
(52) U.S. Cl. ............................ 29/599; 29/33 F; 29/825; 29/844; 29/850; 174/125.1; 174/126.3; 505/230
(58) Field of Classification Search ................ 29/33 B, 29/33 D, 33 T, 599, 868–871, 745, 844, 850, 29/825; 174/15.5, 75 R, 125.1, 126.3; 505/230–234; 138/113
See application file for complete search history.

(56) References Cited

U.S. PATENT DOCUMENTS

| | | | | |
|---|---|---|---|---|
| 3,603,715 A | | 9/1971 | Eilhardt et al. ............... 174/15 |
| 3,735,018 A | * | 5/1973 | Griesinger ..................... 174/28 |
| 3,873,799 A | * | 3/1975 | Scheffler et al. .............. 29/599 |
| 4,397,081 A | * | 8/1983 | Ziemek et al. ................ 29/599 |
| 4,984,605 A | | 1/1991 | Schippl ....................... 138/149 |
| 2002/0148101 A1 | | 10/2002 | Hirose et al. ................. 29/599 |

FOREIGN PATENT DOCUMENTS

| | | |
|---|---|---|
| JP | 09134624 | 5/1997 |
| JP | 2002/016552 | 1/2002 |

OTHER PUBLICATIONS

German Search Report dated Jan. 12, 2004.

* cited by examiner

*Primary Examiner*—Minh Trinh
*Assistant Examiner*—Donghai D. Nguyen
(74) *Attorney, Agent, or Firm*—Sofer & Haroun, LLP

(57) ABSTRACT

A process is provided for the production of a superconducting cable having a single cable core that contains at least one elongated superconducting element and a flexible tube that which surrounds the cable core. The process includes continuously pulling the single cable core from a supply unit, continuously pulling a metal strip from a strip supply unit and continuously forming a slotted tube around the cable care with the metal strip to form a slotted tube. The longitudinal slot of the slotted tube is welded shut corrugating the welded tube with the cable core inside the tube. The then semi-finished superconducting cable is wound in at least one turn on a cable drum, and the ends of the cable core are mechanically joined to the ends of the corrugated tube while the cable is on the cable drum.

4 Claims, 2 Drawing Sheets

PROCESS FOR PRODUCING A SUPERCONDUCTING CABLE

RELATED APPLICATION

This application is related to and claims the benefit of priority from German Patent Application No. 103 22 625.7, filed on May 20, 2003, the entirety of which is incorporated herein by reference.

FIELD OF THE INVENTION

The invention pertains to a process for producing a superconducting cable.

A flexible, high-power, DC superconducting cable is known from *Elektrotechnische Zeitung* (ETZ-b), Vol. 26, p. 215, 1974. This cable has a ribbon-like superconductor made of stabilized $Nb_3Sn$, which is surrounded by a so-called "cryogenic envelope".

BACKGROUND OF THE INVENTION

The conductor is hollow, and liquid helium flows through it during operation. Between the cryogenic envelope and the conductor, there is a channel, through which liquid or gaseous helium also flows as a return line.

The cryogenic envelope consists of several corrugated metal tubes, arranged a certain distance from each other, between which a vacuum is present as well as so-called "superinsulation".

A cable of this type can be produced in lengths of up to 200 m on a continuous production basis. The maximum transmission-line power of a system consisting of two of these types of single-conductor cables is 5 GW.

A superconducting cable in which a plurality of tapes, consisting of so-called 2nd-generation superconducting material, are wrapped around a support tube, through which liquid nitrogen flows, is known from spring 1999 edition of the *Epri Journal*. These modern superconductors consist of flexible metal tape, onto which an yttrium-barium-copper oxide compound has been applied.

A corrugated metal tube is provided over the superconducting tapes. Several layers of thermal insulation are then wrapped around the corrugated metal tube. The thermal insulation is surrounded by a second corrugated metal tube, and a spacer of Teflon is also provided on the thermal insulation. A solid dielectric and an external electrical shield are installed around the second corrugated metal tube.

Common to both types of cable is that, when the cable is in the operating state and the superconductor and the cable elements surrounding it are at the temperature of the liquid helium or of the liquid nitrogen, they become shorter than the external cable elements, which are at ambient temperature. To prevent this decrease in length, fittings are provided at both ends of the cable to connect the individual cable elements nonpositively to each other and thus to prevent the inner cable elements from becoming shorter than the outer cable elements.

Proceeding from this state of the art, the task of the present invention consists in providing a process for the production of superconducting cable, according to which it is guaranteed during the production process itself that the cable core will not contract as a result of a drop in temperature and become shorter than the outer cable elements, which are at ambient temperature.

OBJECT AND SUMMARY OF THE INVENTION

This task is accomplished by the characterizing features stated in Claim 1.

BRIEF DESCRIPTION OF THE DRAWINGS

The invention is explained in greater detail on the basis of an exemplary embodiment, which is illustrated schematically in the figures.

DETAILED DESCRIPTION

Figure 1:
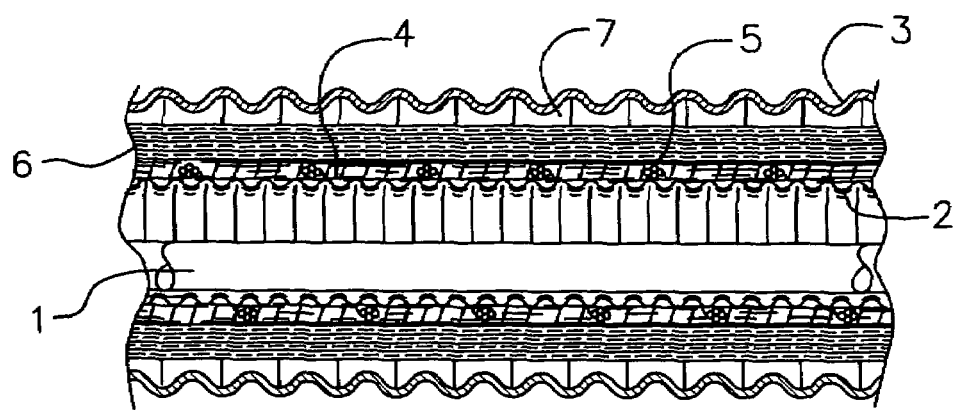
FIG. 1 illustrates a lateral cross section through a superconducting cable, according to one embodiment of the present invention.

The cable core 1 is located in a so-called "cryogenic envelope", which is built up out of an inner corrugated tube 2 and an outer corrugated tube 3, which is located a certain distance away from the inner corrugated tube 2.

A layer 4 is wound around the inner corrugated tube; this layer consists of plastic film, both sides of which have been coated with vapor-deposited aluminum. A spacer 5 is wound around the layer 4; this spacer consists advantageously of several strands of plastic, glass fibers, or a ceramic material, which are interwoven with each other in a braid-like manner.

A so-called "superinsulating" layer 6 surrounds the spacer 5. This layer consists of alternating plies of metal foils or metal-coated plastic films and sheets of nonwoven plastic material or of a nonwoven material based on glass fibers or ceramic materials.

The structure of a cryogenic envelope is the object of EP 0 326 923 B 1.

Before the superconducting cable is put into service, the ring-shaped space 7 between the corrugated tubes 2 and 3 is evacuated.

To cool the superconducting cable 1, liquid nitrogen is conducted through the support tube of the cable core and through the interior space of the corrugated tube 2.

Figure 2:
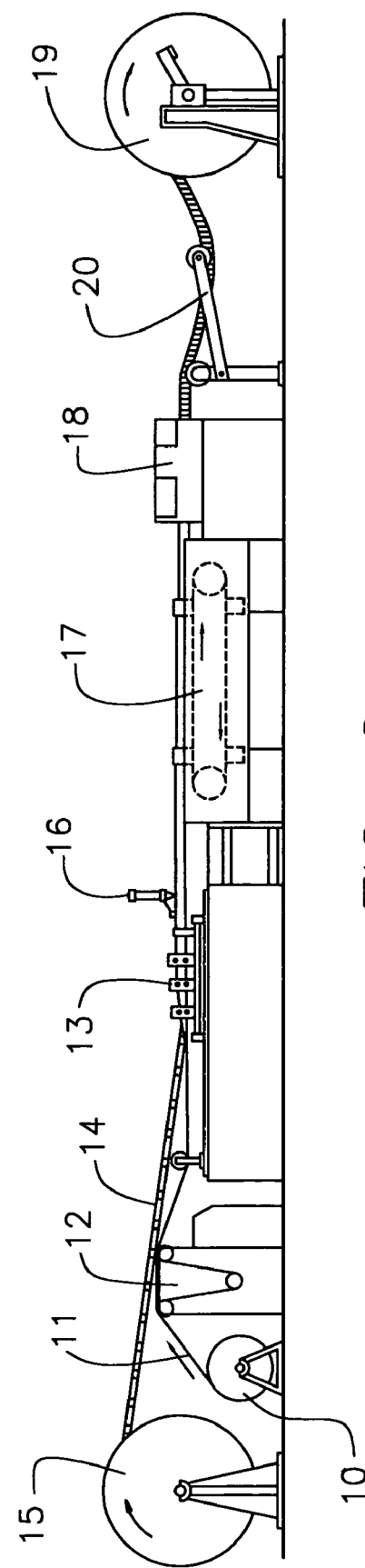
FIG. 2 illustrates a side view of a production system, according to one embodiment of the present invention.

FIG. 2 shows a side view of a production system, by means of which the superconducting cable can be fabricated.

A metal strip 11 is pulled continuously from a coil 10; this strip is cleaned if desired in a strip-cleaning unit 12 and is gradually formed in a shaping device 13 into a slotted tube with a longitudinal seam.

The longitudinal seam of the slotted tube is then welded in a welding station 16, and the welded tube with the cable core 14 inside it is sent by pay-off device 17 to a corrugating device 18.

In the corrugating device 18, the longitudinally welded tube is corrugated, and then it is wound up on a cable drum 19. A so-called dancer 20 regulates the pay-off speed of the cable drum 19.

After the desired length of superconducting cable has been produced or after the cable drum 19 has become full, the two ends of the cable core 14 are connected nonpositively to the ends of the corrugated tube 2.

Because the cable core 14 is much stiffer than the corrugated tube, the cable core 14 rests against the corrugated tube, namely, against the larger radius of the coiled corrugated tube. The cable core inside the corrugated tube is therefore longer than the corrugated tube.

In a following step of the process, the elements shown in FIG. 1, namely, the metal foil 4, the spacer 5, the superinsulation 6, and the outer corrugated tube 3, are applied over the corrugated tube in a similar type of production system.

Figure 3:
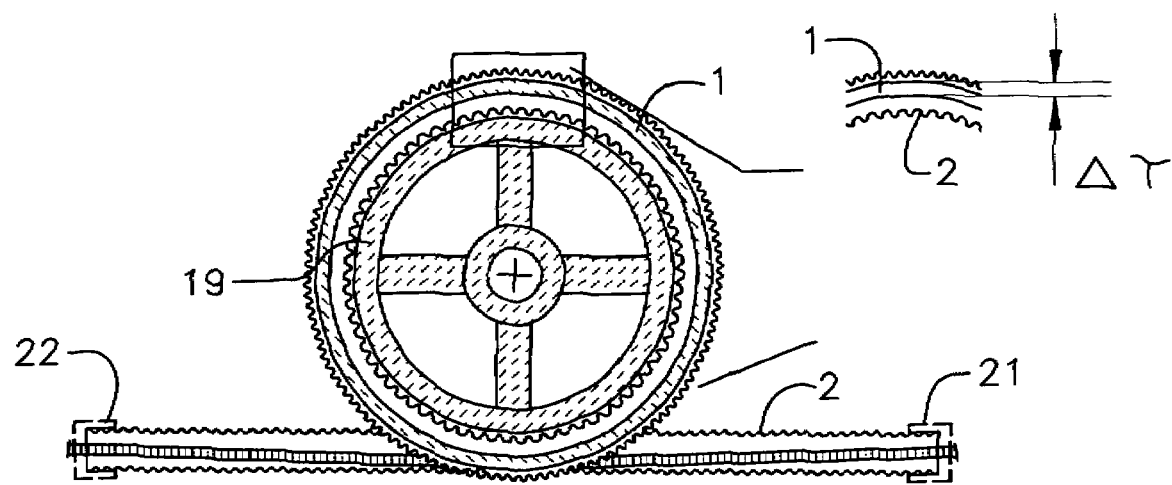
FIG. 3 illustrates cross section through the core of the cable drum, in accordance with one embodiment of the present invention.

FIG. 3 shows a cross section through the core of the cable drum 19, on which the corrugated metal tube (inner corrugated tube 2 according to FIG. 1) with the cable core 1 or 14 (according to FIG. 2) inside it is wound up. It is easy to see that the stiff cable core 1 rests against the radially outer part of the inside surface of the corrugated tube 2, and thus the length which it has inside the corrugated tube 2 is greater than the length of the corrugated tube 2.

The length difference $\Delta l$ (=excess length) is calculated by the use of the following formula:

$$\Delta l = \Delta r \times \pi \times 2 \times a$$

where $\Delta r$ is the difference between the radii of the inside diameter of the corrugated tube 2 and the outside diameter of the cable core of the superconducting cable on the drum, and a is the number of turns of cable on the cable drum.

If the corrugated tube 2 has an inside diameter of 60 mm, the cable core has an outside diameter of 50 mm, and the core diameter is 3,000 mm, we obtain an excess length of 3 cm per turn. The total length of one turn of the tube is 9.4 m. The excess length is thus 0.3%. Thus a contraction of the cable core of less than 0.3% as the core cools down to the temperature of liquid nitrogen can therefore be easily compensated.

FIG. 3 shows a length of cable which has been wound around a cable drum 19. It can be seen easily here that the cable core 1, because of its stiffness, rests against the radially outside wall of the corrugated tube 2.

The cable core 1 and the corrugated tube 2 are connected nonpositively to each other while they are still wound around the drum, as indicated schematically at 21 and 22.

The invention claimed is:

1. Process for the production of a superconducting cable having a single cable care, which contains at least one elongated superconducting element, and a flexible tube, which surrounds the cable core, said process comprising the steps of:
   (a) continuously pulling the single cable core from a supply unit;
   (b) continuously pulling a metal strip from a strip supply unit;
   (c) continuously forming a slotted tube around the cable core with the metal strip to form a slotted tube; welding a longitudinal slot of the slotted tube shut; corrugating the welded tube with the cable core inside the tube, where the inside diameter of the corrugated tube is larger than the outside diameter of the cable core to form a semi-finished superconducting cable;
   (d) winding the semi-finished superconducting cable in at least one turn on a cable drum; and
   (e) mechanically joining the ends of the cable core to the ends of the corrugated tube while the cable is on the cable drum.

2. Process according to claim 1, wherein the forming of the metal strip into a tube or the corrugation of the welded metal tube is carried out in such a way that the cable core has an excess length $\Delta l$ in the corrugated metal tube, which is calculated according to the formula $\Delta l = (R-r)\pi \times 2a$, where R is the inner radius of the corrugated tube, r the outer radius of the cable core, and a the number of turns.

3. Process according to claim 1, wherein the excess length $\Delta l$ is more than 0.25% of the original length of the cable core.

4. Process according to claim 1, wherein the cable core contains a high-temperature superconductor.

* * * * *